US010846753B2

(12) United States Patent
Soon-Shiong

(10) Patent No.: US 10,846,753 B2
(45) Date of Patent: Nov. 24, 2020

(54) SENTIMENTS BASED TRANSACTION SYSTEMS AND METHOD

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 16/566,712

(22) Filed: Sep. 10, 2019

(65) Prior Publication Data

US 2020/0005359 A1 Jan. 2, 2020

Related U.S. Application Data

(63) Continuation of application No. 14/596,090, filed on Jan. 13, 2015, now Pat. No. 10,453,097.

(60) Provisional application No. 61/926,512, filed on Jan. 13, 2014.

(51) Int. Cl.
*G06Q 30/02* (2012.01)

(52) U.S. Cl.
CPC .............................. *G06Q 30/0269* (2013.01)

(58) Field of Classification Search
None
See application file for complete search history.

(56) References Cited

U.S. PATENT DOCUMENTS

| 6,711,293 | B1 | 3/2004 | Lowe |
| 7,949,672 | B2 | 5/2011 | Zhang et al. |
| 8,326,630 | B2 | 12/2012 | Chandrasekar et al. |
| 8,462,996 | B2 | 6/2013 | Moon et al. |
| 8,515,136 | B2 | 8/2013 | Mori et al. |
| 10,453,097 | B2 | 10/2019 | Soon-Shiong |
| 2002/0156866 | A1 | 10/2002 | Schneider |
| 2006/0064411 | A1 | 3/2006 | Gross et al. |
| 2006/0277474 | A1 | 12/2006 | Robarts et al. |
| 2007/0276729 | A1 | 11/2007 | Freer |
| 2008/0126284 | A1 | 5/2008 | Forbes et al. |
| 2009/0049032 | A1 | 2/2009 | Maghoul et al. |
| 2009/0228439 | A1 | 9/2009 | Manolescu et al. |
| 2010/0141663 | A1 | 6/2010 | Becker et al. |

(Continued)

FOREIGN PATENT DOCUMENTS

| EP | 1643390 A1 | 4/2006 |
| JP | 2001087559 A | 4/2001 |

(Continued)

OTHER PUBLICATIONS

Valentina Mazzonello, Salvatore Gaglio, Agnese Augello, and Giovanni Pilato, "A Study on Classification Methods Applied to Sentiment Analysis" 2013; IEEE; 426-431 (Year: 2013).*

(Continued)

*Primary Examiner* — Sam Refai
*Assistant Examiner* — Rashida R Shorter
(74) *Attorney, Agent, or Firm* — Mauriel Kapouytian Woods LLP; Lana Akopyan; Andrew A. Noble

(57) ABSTRACT

Systems and methods of facilitating transactions related to targeted or customized commercial offerings based on derived sentiment states are provided. The sentiment states are derived from digital representations such as images, videos and sound recordings.

26 Claims, 5 Drawing Sheets

(56) References Cited

U.S. PATENT DOCUMENTS

| | | | |
|---|---|---|---|
| 2010/0205180 A1 | 8/2010 | Cooper et al. | |
| 2011/0098029 A1 | 4/2011 | Rhoads et al. | |
| 2011/0313954 A1 | 12/2011 | Zhao et al. | |
| 2012/0072936 A1* | 3/2012 | Small | G06Q 30/00 725/10 |
| 2012/0130969 A1 | 5/2012 | Wong et al. | |
| 2012/0165046 A1 | 6/2012 | Rhoads et al. | |
| 2012/0290432 A1 | 11/2012 | Tedjamulia et al. | |
| 2013/0006777 A1 | 1/2013 | Krishnareddy et al. | |
| 2013/0018954 A1 | 1/2013 | Cheng | |
| 2013/0031081 A1 | 1/2013 | Vijayaraghavan et al. | |
| 2013/0194406 A1 | 8/2013 | Liu et al. | |
| 2013/0204813 A1 | 8/2013 | Master et al. | |
| 2013/0243392 A1 | 9/2013 | Vasudevan et al. | |
| 2015/0120641 A1 | 4/2015 | Soon-Shiong | |
| 2015/0143404 A1 | 5/2015 | Byers | |
| 2019/0294981 A1 | 9/2019 | Soon-Shiong et al. | |

FOREIGN PATENT DOCUMENTS

| | | |
|---|---|---|
| WO | 03041000 A1 | 5/2003 |
| WO | 2008134901 A1 | 11/2008 |
| WO | 2011000046 A1 | 1/2011 |
| WO | 2012064530 A1 | 5/2012 |

OTHER PUBLICATIONS

International Search Report and Written Opinion, International Patent Application No. PCT/US2014/062575, dated Jan. 16, 2015, 12 pages.

Examination report No. 1 for standard patent application, Australian Patent Application No. 2014342551, dated Dec. 2, 2016, pp. 1-3.

Extended European search report, European Patent Application No. 14856964.3-1871, dated Mar. 16, 2017, pp. 1-7.

Lorenz, 25 Essential Expressions Challenge, exercise sheet, 2007, 1 page.

Affectiva technology taps into people's emotions, Technology / Hi Tech & Innovation, Apr. 1, 2011, pp. 1-2, AFP, Physorg.com, http://www.physorg.com/news/2011-04-affectiva-technologypeople-emotions.html.

Programming regret for Google: Scientists give computers 'hindsight' to anticipate the future, Technology / Computer Sciences, Apr. 13, 2011, pp. 1-2, Tel Aviv University, Physorg.Com, http://www.physorg.com/news/2011-04-google-scientists-hindsight-future.html.

Searching the brain for social networks, Medicine / Phsychology & Psychiatry, Apr. 5, 2011, pp. 1-3, Princeton University, Physorg.com, http://www.physorg.com/news/2011-4-brain-social-networks.html.

What is RoboEarth?, RoboEarth, downloaded Jun. 6, 2013, pp. 1-2, www.roboearth.org/what-is-roboearth.

Affective computing, Wikipedia, the free encyclopedia, last modified May 22, 2013, pp. 1-12, en.wikipedia.org/wiki/Affective_computing.

Vinodhini et al., Sentiment Analysis and Opinion Mining: A Survey, International Journal of Advanced Research in Computer Science and Software Engineering, Jun. 2012, pp. 282-292, vol. 2—Iss. 6, www.ijarcsse.com.

International Search Report and Written Opinion, International Patent Application No. PCT/US2015/011266, dated Apr. 27, 2015, 12 pages.

International Preliminary Report on Patentability, International Patent Application No. PCT/US2015/011266, dated Apr. 15, 2016, 4 pages.

Examination report No. 1, Australian Application No. 2017251780, dated Nov. 12, 2018, 2 pages.

Brahler, Analysis of the Android Architecture, Karlsruher Institute fur Technologie, Universitat des Landes Baden-Wurttemberg, 2010, 52 pages.

Cartright et al., Intentions and Attention in Exploratory Health Search, SIGIR '11, 2011, pp. 65-74, Beijing, China.

Marache-Francisco et al., Process of Gamification, From the Consideration of Gamification to Its Practical Implementation, CENTRIC 2013: The Sixth International Conference on Advances in Human-oriented and Personalized Mechanisms, Technologies, and Services, 2013, pp. 126-131, IARIA.

Goel et al., Predicting consumer behavior with Web search, Microeconomics and Social Systems, Yahoo! Research, Oct. 12, 2010, pp. 17486-17490, vol. 107, No. 41, PNAS.

Narayanan et al., Multimodal Systems for Children: Building a Prototype, 1999, 4 pages, AT&T Labs—Research, Park, NJ. Florham.

Georgiadis, Adaptation and Personalization of User Interface and Content, Chapter XVIII-XXXVIII, Mobile Magazines, Jan. 2006, pp. 266-598, ResearchGate.

Rosa et al., Music Recommendation Systems Based on User's Sentiments Extracted from Social Networks, IEEE International Conference on Consumer Electronics (ICCE), 2015, 9 pages.

Office Action issued in European Patent Application No. 14 856 964.3 dated Nov. 11, 2019, 9 pages.

Office Action issued in Australian Application No. 2019204800 dated Jul. 22, 2020, 3 pages.

\* cited by examiner

| Scene Data | Sentiment Characteristics | Sentiment States |
|---|---|---|
| A clock or watch; Brightness; Sunlight; Sunglasses; Shadows; Raccoon; A symbol (e.g., a number, etc.); Moonlight; Sun; Moon; Darkness | Time of day:<br>• Daytime: {brightness; time between 6AM and 6PM; sunlight; sunglasses; shadows}<br>• Evening: {darkness; time between 6PM and 6AM; moon; nocturnal animal} | Excitement: {time of day = daytime; weather = going out weather; location = crowded area; environment = leisurely} |
| A head; an angle; a degree; a person; a wall; a position | Posture:<br>• Head in hand: {head tilt between 10-60 degrees; person}<br>• Head leaning on wall: {person; wall; head tilt between 10-60 degrees} | Depression: {weather = staying in weather; location = non-crowded area; environment = hospital; facial expression = frowning; facial expression = crying} |
| Brightness; sunlight; sunglasses; jacket; fog; clarity; sky; a color; tree; persons; snow; rain; lightning; object position or location | Weather:<br>• Going out weather: {brightness; sunlight; sunglasses; jackets; lack of fog; blue skies; people sitting under tree}<br>• Staying in weather: {snow; fog; rain; lightning; flying objects} | Fatigue: {location = crowded area; facial expression = frowning} |
| Persons; books; eyes; angles; bottle; label; stage | Location:<br>• Non-crowded or quiet area: {few number of people in area; books; people looking down}<br>• Crowded area: {many people in area; alcohol; vendors; people looking up; people looking in same direction; stage} | Focused: {location = quiet area; environment = office; environment = hospital; event = concert} |
| Scrubs uniform; stretcher; curvature; mouth; gown; persons; chart; scalpel; computer; door; wall; angles; phone; blinds; shades; plant; clothes; table; size data; sun; sunglasses; shading data; trees; grass; | Environment:<br>• Hospital: {scrubs; stretcher; frowns; gowns; charts; scalpel}<br>• Office: {computer; closed door; person on telephone; blinds; plants; suits; people around a large table}<br>• Leisurely: {sunlight; sunglasses; trees; grass; roller coaster; vendor; kids} | Bored: {posture = head in hand; posture = head leaning on wall; gaze direction = away from persons or objects}<br><br>Pensive: {posture = leaning forward; environment = hospital; environment = office; location = quiet area} |

Figure 3A

| | | |
|---|---|---|
| roller coaster; height data | | |
| Curvature data; mouth; direction; eyes; tear; size data; distance data | Facial Expression:<br>• Smiling: {curved mouth; upward direction; squinted eyes}<br>• Frowning: {curved mouth; downward direction}<br>• Crying: {closed eyes; tears; open mouth; curved mouth; downward direction; slouching; hand near eye}<br>• Screaming: {open mouth; closed eyes; fists} | Argumentative: {posture = leaning forward; facial expression = screaming; environment = office}<br><br>Eager: {location = crowded area}<br>Self-conscious: {posture = slouching; posture = hunched; direction of gaze = looking up; direction of gaze = looking down}<br><br>Confident: {facial expression = smiling; environment = leisurely; activity = dancing; facial action = wink; direction of gaze = looking straight ahead} |
| Persons; distance data; centroid data; stage; bottle; label; microphone; guitar; direction of view data; table; mouth; motion data; cake; candle; flame; symbols | Event:<br>• Concert: {many people in area; stage; vendor; alcohol; microphone; instruments}<br>• Party: {many people in area; alcohol; people facing one another; table of food; dancing}<br>• Birthday: {cake; candle; "happy birthday"; gift wrapper} | |

Figure 3B

SENTIMENTS BASED TRANSACTION SYSTEMS AND METHOD

This application is a continuation application of U.S. application Ser. No. 14/596,090, filed Jan. 13, 2015, which claims priority to U.S. provisional application Ser. No. 61/926,512, filed Jan. 13, 2014. The contents of these applications and all other extrinsic materials referenced herein are hereby incorporated by reference in their entirety.

FIELD OF THE INVENTION

The field of the invention is computer-based targeted transaction facilitating systems and methods.

BACKGROUND

The following description includes information that may be useful in understanding the present invention. It is not an admission that any of the information provided herein is prior art or relevant to the presently claimed invention, or that any publication specifically or implicitly referenced is prior art.

Targeted advertising, a type of advertising wherein advertisements are placed to reach certain groups of consumers based on demographics, behavioral variables and some other traits, has existed in limited forms for several years. Unfortunately, targeted advertising has been controversial due to privacy concerns, and the effectiveness of targeted advertising is questionable due to changes in, and decreasing predictability of, societal behavior.

One field in which long term changes in behavior do not have a great impact relates to understanding a person's current sentiments based on image data or other digital data. Examples of efforts in this field include Japanese patent publication no. 2001/087559 to Murata relating to determining a mental state from an image of a user, and U.S. Pat. No. 8,462,996 to Moon et al. relating to methods of determining a person's emotional response to a visual stimulus based on the person's facial expression.

These and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Unfortunately, previous efforts have apparently failed to appreciate that an understanding of a person's sentiments could be used to customize commercial offerings and facilitate transactions.

Thus, there is still a need for improved targeted transaction facilitating systems and methods.

SUMMARY

The inventive subject matter provides computer-based apparatus, systems and methods in which a targeted or customized commercial offering can be provided based at least in part on a sentiment derived from a digital representation of a scene. Some contemplated systems can advantageously recognize objects or people in a scene, derive characteristics associated with the scene and infer a sentiment state of a person in the scene or a person viewing the scene. Additionally or alternatively, the system could map the inferred sentiment to one or more associated commercial offerings, present them to a user and facilitate a transaction between the user and a vendor associated with the commercial offering.

Viewed from another perspective, an exemplary system of the inventive subject matter can include a digital sensor, one or more databases storing sentiment states and associated commercial offerings, and one or more engines configured or programmed to (1) obtain digital data from the digital sensor, (2) query the one or more databases using the digital data to determine one or more sentiment states and one or more associated commercial offering, and at least one of (3) provide the commercial offering(s) to a user, and (4) facilitate a transaction between the user of the system and a vendor related to the commercial offering(s).

In some aspects of the inventive subject matter, a communications subsystem can provide a link to at least one of an offeree and a vendor to facilitate one or more transactions. Some exemplary transactions include a sale, a purchase, a license, a lease, a preview, a download, a vote, a sale, or an exchange. The communications subsystem can additionally or alternatively facilitate a by executing the transaction or by causing the transaction to be executed.

Various objects, features, aspects and advantages of the inventive subject matter will become more apparent from the following detailed description of preferred embodiments, along with the accompanying drawing figures in which like numerals represent like components.

. BRIEF DESCRIPTION OF THE DRAWINGS

FIGS. 3A-3B illustrate a table including non-limiting examples of scene data, sentiment characteristics, and sentiment states.

DETAILED DESCRIPTION

Figure 1:
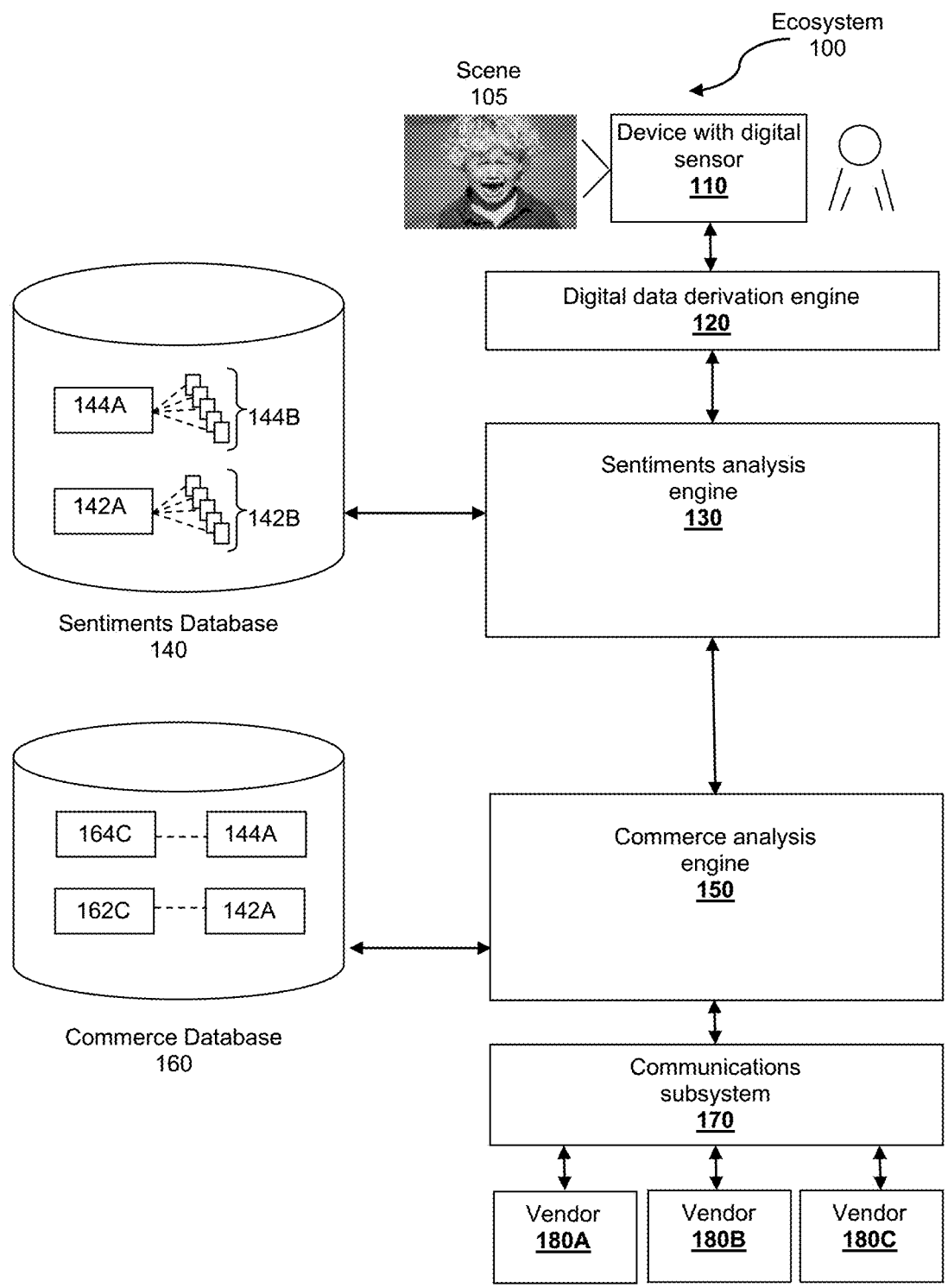
FIG. 1 illustrates an ecosystem including a system of the inventive subject matter.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions preferably configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or implementations of algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; PSTN; or other type of network.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

The focus of the disclosed inventive subject matter is to enable construction or configuration of a computing device to operate on vast quantities of digital data, beyond the capabilities of a human. Although the digital data in disclosed embodiments represent sentiment or sentiment states, it should be appreciated that the digital data is a representation of one or more digital models of a sentiment state, not a human's sentiment itself. By instantiation of such digital models in the memory of the computing devices, the computing devices become specialized to manage the digital data or models in a manner that the computing devices lacked a priori and that could provide utility to a user of the computing device that the user would lack without such a tool.

The inventive subject matter provides apparatus, systems and methods in which a targeted or customized commercial offering can be provided based at least in part on a sentiment derived from a digital representation of a scene. Some contemplated systems can advantageously recognize objects and people in a scene, derive characteristics associated with the scene and infer a sentiment state of a person in the scene or a person viewing the scene. Additionally or alternatively, the system could map the inferred sentiment to one or more associated commercial offerings, present them to a user and facilitate a transaction between the user and a vendor associated with the commercial offering. Viewed from another perspective, a system of the inventive subject matter can provide commercial offerings to users based at least in part on a sentiment of the user or a person in the user's environment.

One should appreciate that the inventive subject matter allows targeted or customized commercial offerings to be provided, and for transactions to be facilitated, initiated and executed, based on a sentiment derived from a digital representation, optionally in real time or near real time. Further, the disclosed sentiment analysis techniques relate to computing devices that, a priori, lack capabilities of understanding, let alone taking action on, modeled sentiment. Still further, the disclosed techniques focus on configuring computing devices to model sentiments based on one or more digital data modalities (e.g., digital images, digital video, digital sound, etc.) One should further appreciate that the manipulation of such digital data constructs in order to model sentiment exceeds the capacity of a human begin to analyze the digital data.

An exemplary system, such as the system shown in the ecosystem of FIG. 1, can include a digital sensor (e.g., the sensor of device 110, etc.), one or more databases storing sentiment states and associated commercial offerings (e.g., commercial offerings 140 and 160, etc.), and one or more engines (e.g., sentiments analysis engine 130 and commerce analysis engine 150, etc.) programmed to (1) obtain digital data via the digital sensor, (2) query the one or more databases using the digital data to determine one or more sentiment states and one or more associated commercial offering, and at least one of (3) provide the commercial offering(s) to a user, and (4) facilitate a transaction between the user of the system and a vendor related to the commercial offering(s). Some or all of the components of a system of the inventive subject matter can be implemented as software modules that when executed by one or more processing units (e.g., a processor, a processing core, etc.) perform functions and fulfill the roles or responsibilities described herein.

The "digital data" that is obtainable via the digital sensor can include a digital representation of an environment or scene. For example, the digital representation can include one or more images, videos, or audio clips/sounds. In some embodiments, when a digital data derivation engine obtains the digital representation from the digital sensor, the digital data derivation engine extracts scene data from the digital representation.

Additionally or alternatively, digital data can include scene data that is derived from the digital representation, for example, by executing an implementation of an object recognition algorithm (e.g., SIFT, FREAK, DAISY, FAST, etc.) on a set of images received from a different computing device.

Where an implementation of an image recognition algorithm is executed, descriptor sets or other quantified feature sets can be obtained as scene data. The term "descriptor" is used euphemistically to mean a data structure stored in memory where the values in the data structure are derived by executing one or more implementations of algorithms (e.g., object recognition algorithm, etc.) on a digital representation of an object or scene stored in the memory. Descriptors might represent local or global features in the digital representation (e.g., edges, corners, etc.). Descriptors could also represent specific measures associated with patches of the image (e.g., SIFT descriptors, Histogram of Gradients, etc.). One can use an implementation of an image recognition algorithm such as scale-invariant feature transform (SIFT; see U.S. Pat. No. 6,711,293 titled "Method and apparatus for identifying scale invariant features in an image and use of same for locating an object in an image" filed Mar. 6, 2000) to detect and describe local features (as descriptors) in images. A typical SIFT descriptor can be a 128-byte vector that represents a 128-bin histogram of gradient orientations. A global descriptor could comprise a histogram with thousands of bins; Vector of Locally Aggregated Descriptors (VLAD) for example. Multiple descriptors can be derived from a single image. As such, each distinct image of an object can be associated with a set of descriptors that uniquely defines the different features of the object. In some embodiments, an engine of a system can recognize objects that are represented in a digital representation (e.g., an image, etc.) based on the descriptors derived from the digital representation and the known associations between the descriptors and the objects.

The scene data that is obtained by (or derived from a digital representation by) the one or more engines can be used to determine one or more sentiment characteristics based on a query of a database and a set of rules for associating sets of scene data with sentiment characteristics.

FIGS. 3A-3B illustrate a table including some non-limiting examples of "scene data," "sentiment characteristics," and "sentiment states" as used in the description and claims herein. Sentiment states could include any feeling, emotion, view, opinion, attitude, thought or belief that is associated with at least one of scene data and one or more sentiment characteristics. At a basic level, sentiment includes a representation that indicates an individual might have a feeling that is positive, negative, or neutral toward as topic or item of interest. Still, in more complex embodiments, this can be a feeling, emotion, view, opinion, attitude, thought or belief associated with a person in the scene, or a feeling, emotion, view, opinion, attitude, thought or belief associated with a person viewing or capturing the scene.

It should be appreciated that the subject matter of FIGS. 3A-3B is represented by digital data constructions in the memory of the disclosed computing devices. For example, scene data can comprise digital identifiers (e.g., GUID, UUID, Hash values, etc.) that represent each type of item or object in in scene. The sentiment characteristics can comprise attribute-value pairs that represent specific features or measurable values derived from the scene's digital data. As an example, time of day could be a digital time stamp obtained from a cell phone's internal clock or an internet time server. An additional example of sentiment characteristics could include specific GPS coordinates. Sentiment state represents an instantiated data object where the corresponding state depends on the scene characteristics. In some embodiments, the sentiment state can be instantiated from an a priori defined class in the object oriented programming sense, where sentiment characteristics are passed to a constructor of the class. In other embodiments, the sentiment state could be a predefined data object (e.g., a template, a database record, etc.) having sentiment criteria that must be satisfied in order for the state to be considered valid or applicable.

It should be appreciated that a sentiment characteristic could be determined as a valid match to scene data even where each of the items associated with the characteristic (e.g., the items included in { } FIGS. 3A-3B) is not present. For example, scene data obtained from an image might include "stage" and "alcohol." Depending on the relevant rule, the scene data may be determined to be a valid match to the sentiment characteristic of a concert even though "many people in area," "vendor," "microphone" and "instruments" are not present. Viewed from another perspective, the relevant rule could require a threshold number or percentage of items to be present in a set of scene data to be mapped to a sentiment characteristic.

Similarly, it should be appreciated that a sentiment state could be determined as a valid match to sentiment characteristics even where each of the characteristics associated with the state (e.g., the items included in { }) is not present.

Ecosystem 100 comprises a device 110 having a digital sensor configured to capture a digital representation of a scene 105. The device could comprise any suitable device such as cell phones, cameras, tablets, phablets, laptop computers, kiosks, audio recorders, and video cameras, and the digital representation could comprise any data including images, videos, or audio that can be captured by a suitable device. Thus, digital representation could comprise one or more digital data modalities (e.g., image, audio, tactile, temperature, time, location, biometric, heart rate, blood pressure, etc.). Where scene 105 includes objects, it should be appreciated that the objects could be identified and features of the objects could be derived to determine a sentiment of a user viewing the scene. Additionally or alternatively, where scene 105 includes at least a portion of a person (especially a person's face, fingerprint, eye, mouth, stance, pose, etc.), an identity or other features of the person can be used to determine a sentiment of the person or a user viewing the person.

Device 110 includes or is communicatively coupled to a digital data derivation engine 120 programmed to analyze the digital representation and determine, extract or derive scene data from the digital representation. The digital data derivation engine 120 is communicatively coupled to sentiments analysis engine 130, which can be programmed to obtain at least one of the digital representation and the scene data from the digital data derivation engine 120. In an alternative contemplated embodiment, the sentiments analysis engine 130 could obtain the digital representation from device 110 and determine, extract, derive or otherwise obtain scene data via the digital representation. In yet other contemplated embodiments, two or more of device 110, digital data derivation engine 120, sentiments analysis engine 130, and any other suitable devices or engines could be programmed to derive or extract information from the digital representations to obtain an even more complete set of information (e.g., scene data, etc.) from which to determine a set of sentiment characteristics.

Upon obtaining (e.g., receiving, extracting, deriving or determining, etc.) scene data, sentiments analysis engine 130 can query sentiment states (e.g., sentiment states 144A, 142A, etc.) in a sentiments database 140. In some embodiments, the sentiments database 140 can be implemented as a data storage structure such as a relational database (e.g., SQL, Access, etc.), a non-relational database (e.g., NoSQL, etc.), or a spreadsheet that is indexed by the scene data or associated sentiment characteristics.

Each of the sentiment states is associated with a set of sentiment characteristics 144B, 142B, respectively. Viewed from another perspective, sentiments analysis engine 130 can obtain or determine a set of sentiment characteristics associated with some or all of the obtained data, and can query the sentiments database 140 (and apply rules on the data retrieved from the sentiments database 140) to associate the set of sentiment characteristics with one or more sentiment states. It is contemplated that sentiment state data 144A, 142A determined by the sentiments analysis engine 130 based on scene data or sentiment characteristics could comprise a single sentiment state, a set of sentiment states, or even a ranked set of sentiment states.

For example, based on a set of sentiment characteristics, the sentiments analysis engine 130 can determine that several different sentiment states, some of which may even conflict with one another (e.g., happy, sad, etc.), are relevant to the scene. The sentiments analysis engine 130 can then rank these sentiment states according to their relevancy to a targeted offeree, or other target of interest. In one example where the sentiments analysis engine 130 determines that the scene includes three people with happy faces and one person with a sad face, the sentiments analysis engine 130 can determine that the sentiment state of "happy" is more relevant to the targeted offeree than the sentiment state of "sad," and thus rank "happy" higher than "sad." Furthermore, additional information can be used to provide context, in assistance of ranking the sentiment state. In the same example described above, where the targeted offeree is a person capturing the scene, "sad" may be ranked higher than "happy," for example, if it is determined that the person with the sad face is emotionally closer (e.g., a spouse, etc.), more demographically similar (e.g., same age, etc.) or closer in distance to the targeted offeree relative to the other three people.

The term "sentiment state" is used broadly and includes what is typically referred to as emotions, moods, sentiments, and emotional or personality traits, including for example, an emotional state (e.g., sadness, happiness, depression, anger, fear, nostalgia, joy, disgust, trust, anticipation, surprise, love, friendship, enmity, calmness, confidence, shame, shamelessness, kindness, pity, indignation, envy, etc.), a cognitive state (e.g., readiness, consciousness, unconsciousness, subconscious, curiosity, wonder, confusedness, certainty, doubtfulness, morbidity, preoccupancy, inwardness, etc.) or body-awareness state (e.g., pain, headache, nausea, etc.).

The term "sentiment characteristic" is used broadly and could comprise a subset of the information or scene data from the digital representation. Additionally or alternatively, a sentiment characteristic could comprise a characteristic derived from the scene data. For example, where a digital representation is of a scene including four faces, scene data could include "4 people," and a derived sentiment characteristic could include "smile, smile, frown, smile" (e.g., as represented by image data, keywords, numbers, etc.). Based on the information and sentiment characteristic, additional sentiment characteristics could be derived, including for example, data representative of a "party" (for an environment or event) or "bullying" (for an action or event.

The sentiments analysis engine 130 can comprise or be communicatively coupled to a commerce analysis engine 150 that is programmed to query commercial offerings in the commerce database 160. Similar to the sentiments database 140, the commerce database 160 can be implemented as a data storage structure such as a relational database (e.g., SQL, Access, etc.), a non-relational database (e.g., NoSQL, etc.) or a spreadsheet. Under one approach, the commerce database 160 can be structured to be indexed by sentiment states (e.g., sentiment states 144A and 142A, etc.), so that a user or a program can retrieve a set of relevant commercial offerings based on a set of sentiment states.

In this example, the commerce database 160 stores multiple commercial offerings (e.g., commercial offerings 164C and 162C, etc.). Each of the commercial offerings is associated with (e.g., linked from, etc.) a set of sentiment states (e.g., sentiment states 144A and 142A, etc.). Viewed from another perspective, commerce analysis engine 150 can obtain data associated with one or more sentiment states 144A, 142A from sentiments analysis engine 130, and can query the commerce database 160, which can store rules that can be used to associate the one or more sentiment states with one or more commercial offerings. Where the commerce analysis engine 150 is distal from the sentiments analysis engine 130, sentiments analysis engine 130 can transmit one or more determined sentiment states to commerce analysis engine 150. The results set comprising one or more sentiment states can be ranked according to a fitness measure indicating to what degrees the states satisfy the query. The fitness measure could be calculated as a Hamming distant in embodiments where the query comprises a vector. In other embodiments, the fitness measure should be a count of the number of criterion that match between the query and the states.

Upon determining a commercial offering that is related to the digital data, commerce analysis engine 150 can provide the commercial offering to a user of the system, for example, on a display of device 110. Additionally or alternatively, commerce analysis engine can use the commercial offering to facilitate, initiate or execute a transaction between the user or a person in the scene and a vendor associated with the commercial offering. It should be appreciated that the ranking of the sentiment states can be used to match the states with the commercial offerings. For example, commercial offerings might include one or more criterion that requires a specific fitness measure for the corresponding state. Further, the disclosed systems could monetize such requirements by requiring third parties to pay a fee in exchange for ensuring their offerings, with possible exclusivity, are placed according to a fitness measure schedule; only place the offering when the fitness measure is very high for example.

It should be appreciated that any suitable commercial offering type could be offered based on an association with/mapping to any suitable sentiment state(s) as determined by a set of rules, an implementation of an algorithm, or any other suitable means. For example, a set of rules can be used to map states of frustration and frivolity to an advertisement offering a discount on one or more of video games, massage services from a national chain and boxing equipment.

It should also be appreciated that any suitable digital transaction type could be facilitated, initiated or executed by a system of the inventive subject matter, including for example, a sale, a purchase, an exchange, a preview, a download, a streaming, an order, a payment, a hold, a license, or a lease. As illustrated, commerce analysis engine 150 is communicatively coupled to a communications subsystem 170, which could further facilitate a transaction by (1) providing a link (or other access) to a person or a vendor (180A, 180B, 180C), or (2) initiating or executing at least one transaction between the relevant persons, vendors and entities.

Figure 2A:
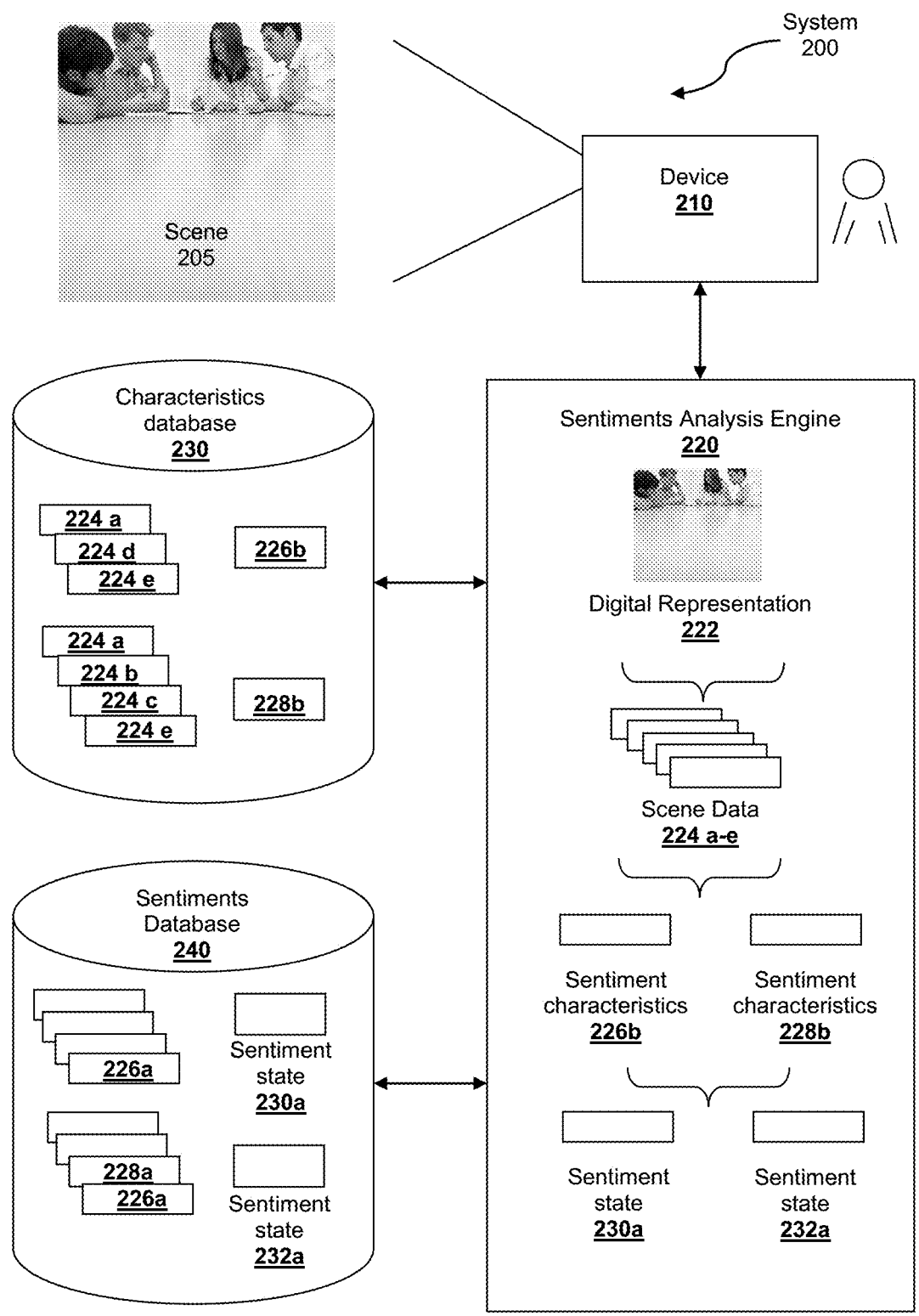
FIGS. 2A-2B illustrate a system for providing commercial offerings wherein multiple sentiment characteristics are determined from digital data.
Figure 2B:
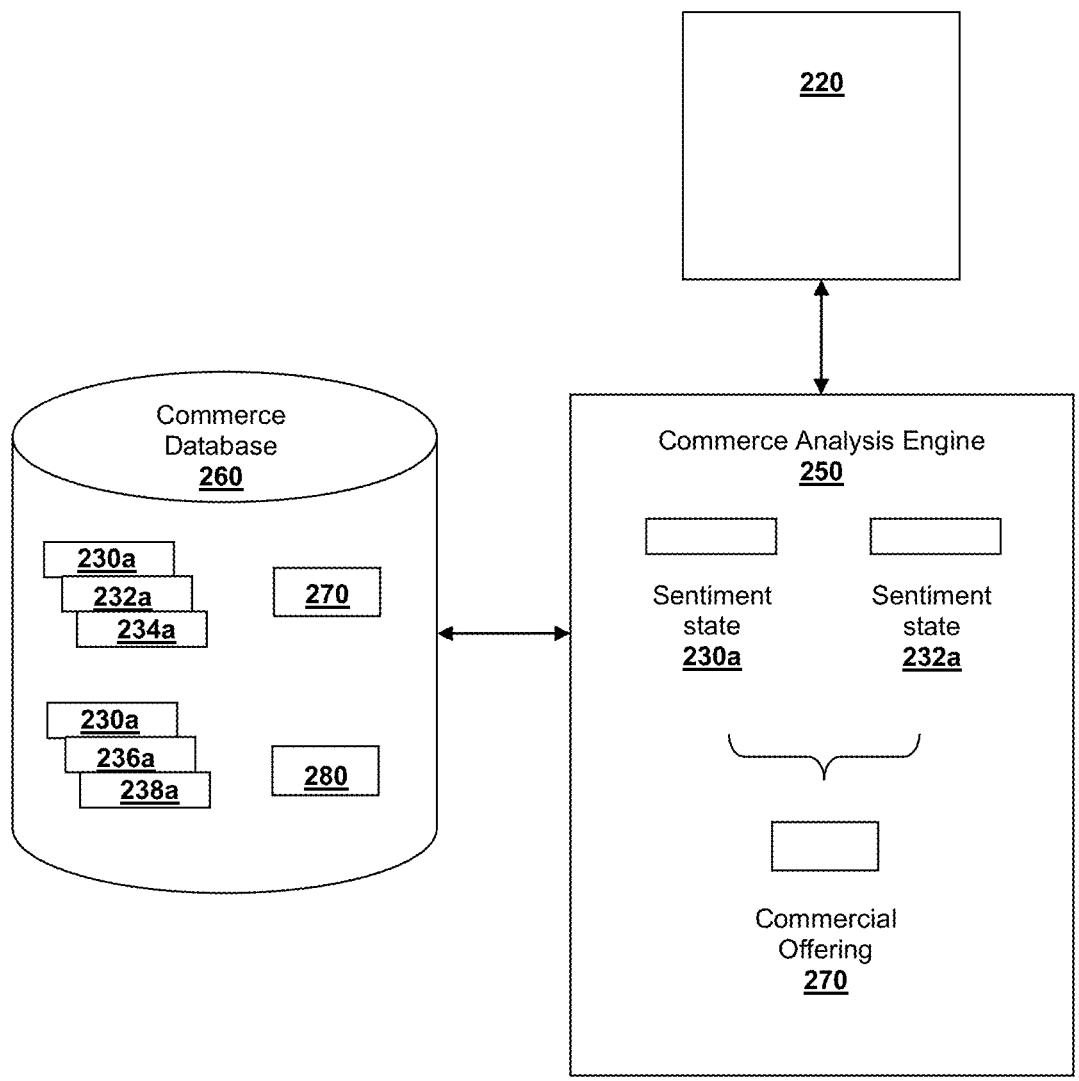

FIGS. 2A-2B illustrate a system of the inventive subject matter including device 210, sentiments analysis engine 220, characteristics database 230, sentiments database 240, commerce analysis engine 250 and commerce database 260. It is contemplated that one or both of the sentiments analysis engine 220 and commerce analysis engine 250 could be operated as a service distal to at least one of device 210, a person carrying device 210 and a person in a digital representation captured by device 210. As used herein, the term "distal" means situated away by at least one half of a mile.

System 200 could be used to infer, determine or otherwise obtain multiple sentiment states represented by a single digital representation 222 of a scene 205. Scene 205 includes numerous objects (e.g., conference table, coffee cup, pens, glasses, dress shirts, etc.) and people (e.g., man leaning over, man with a fist on his face, woman leaning over and writing, and man with glasses in mouth, etc.) from which sentiment characteristics can be derived and mapped to multiple sentiment states. Viewed from another perspective, sentiments analysis engine 220 can receive a digital representation 222 of scene 205 via device 210 and derive or otherwise obtain scene data 224*a-e* related to at least a portion of the digital representation 222. The scene data 224*a-e* could include, among other things, information related to: (a) a characteristic of a person's face, eyes, nose, cheek, forehead or mouth; (b) identification of an object in a scene; (c) a time; (d) a weather; (e) a density of objects, persons or demographic; (f) a height; (g) a weight; (h) a position; (i) an orientation; (j) a direction of a gaze; (k) an interaction; (l) a gesture; (m) a number of persons or objects in a scene; (n)

a type of object; (o) demographic information; or any other suitable information. For example, in FIG. 2, scene data could include the following: (1) people, (2) sun, (3) bright, (4) one focal point, (5) coffee cup, (6) four dress shirts, (7) skin color, (8) varying height, (9) glasses, and (10) chair.

Sentiments analysis engine 220 could obtain or derive scene data 224*a-e* and determine a set of sentiment characteristics 226B, 228B consistent with the scene data. It is contemplated that this step could be accomplished by querying characteristics database 230 storing and programmed to associate scene data (e.g., 224*a-e*, etc.) with one or more sentiment characteristics 226B, 228B based on a suitable set of rules. An implementation of one or more algorithms could be executed on scene data to derive sentiment characteristics. For example, where scene data includes a clock and a number and an arrow, a time of day characteristic can be derived. As another example, where scene data includes a scale, a person and a number, a weight characteristic can be derived. In this example, scene data (1)-(6) above could be mapped to the following sentiment characteristics: (1) Posture=leaning forward towards a single table; (2) focal point=document on table; (3) Time of day=daytime; (4) Gender=male, male, female, male; (5) Hair length=short hair, short hair, long hair, short hair; and (6) Environment=Office.

Additionally or alternatively, it is contemplated that this step could be accomplished without the use of a database. For example, a systems manager could manually match scene data to certain sentiment characteristics. As another example, a characteristic could simply be scene data or information of a type that appears a threshold number of times. For example, where information or scene data from a digital representation includes (1) people, (2) 7:00 AM, (3) bright, (4) one focal point, (5) coffee cup, (6) dress shirts, (7) a set of height, (8) glasses, and (9) seated, the system could be configured to recognize that data relating to daytime appears three times (7:00 AM, bright, coffee cup), and thus determine that daytime is a sentiment characteristics.

Once sentiment characteristics are determined, sentiments analysis engine 220 could use the characteristics to query a sentiments database 240 that is configured to associate sentiment characteristics with one or more sentiment states 230*a*, 232*a*. For example, "daylight" and other sentiment characteristics determined based on the scene data above could be associated with the following sentiment states: (1) conferencing; (2) focused; (3) bored; (4) pensive; (5) tired; (6) debating; (7) eager; (8) stressed; (9) self-conscious; (10) annoyed, or any other suitable sentiment states. Further, in some embodiments, each state could be bound to a specific item or topic of interest, possibly an item in the scene. This approach is considered advantageous because it allows further refinement with respect to placing commercial offerings that a 1) relevant to the sentiment state, and 2) relevant to the item of interest in the scene.

It should be appreciated that a sentiments analysis engine 220 could be configured to determine any suitable number of sentiment characteristics (e.g., at least 1, at least 5, at least 10, at least 15, at least 20, or even 25 or more, etc.) and sentiment states (e.g., at least 1, at least 5, at least 10, at least 15, at least 20, or even 25 or more, etc.) consistent therewith from the extracted scene data. There does not need to be a one-to-one correlation between the number of determined sentiment characteristics and determined sentiment states. For example, there could be a many-to-one correlation or a one-to-many correlation. Where there are multiple sentiment states determined to be consistent with a set of sentiment characteristics related to a digital representation, it is contemplated that a commerce database could be programmed to associate a single commercial offering with one, two or many of the sentiment states, possibly based on a fitness measure or other implementations of ranking algorithms as discussed previously.

Upon determining one or more sentiment states that are related to the digital representation 222, sentiments analysis engine could transmit data related to the sentiment state 230*a*, 232*a* to commerce analysis engine 250. Commerce analysis engine 250 could receive the sentiment states data 230*a*, 232*a* and query commerce database 260 to determine one or more commercial offerings 270, 280 associated with sentiment states 230*a*, 232*a*. Data related to the commercial offering(s) can be presented to a user in any suitable manner, including for example, on a display of device 210, optionally superimposed over a digital representation 222 of scene 205.

Viewed from another perspective and as illustrated in the example of FIGS. 2*a*-2*b*, a system of the inventive subject matter could be configured to utilize digital representations showing objects and people representative of two or more sentiment states, and facilitate one or more transactions based on the two or more sentiment states. For example, it is contemplated that a digital representation could be matched to three sentiment states, for example, depression, defeat and focus related to different persons represented in the scene, and an "associated commercial offering" could comprise an offering associated with one, two or all of the sentiment states.

The following use cases illustrate some contemplated applications for system 200 (or other systems and methods of the inventive subject matter).

Education

Some exemplary uses of a system of the inventive subject matter are in the field of education. A classroom could include one or more devices having one or more digital sensors configured to capture digital imagery and audio in real time during one or more events (e.g., parent-teacher conference, during a class, during detention, etc.).

The digital data could be used to extract, derive or otherwise obtain relevant scene data, the scene data could be used to determine, via a query of a characteristics database, a set of sentiment characteristics (e.g., posture=head in between arms, posture=head in hand, posture, sitting up straight; environment=leisurely; action=talking, action=dancing, action=arguing; focal point=a playground viewable through a window of the classroom, etc.) and associated sentiment states. The sentiment states could be associated with one or more persons in the scene, an observer of the scene or any other person(s) whose sentiments can be implied based on the digital representation. For example, one or more of a state of fear, boredom, focus and excitement could be associated with a particular student, the same or a different set of states could be associated with a subset of the students in the room, the same or a different set of states could be associated with the students as a whole, and the same or a different set of states could be associated with the instructor.

The sets of sentiment states could then be mapped to various commercial offerings, and the commercial offerings associated with one or more of the particular student, set of students, students as a whole and instructor could be presented to a user. The commercial offerings could be presented automatically based on the capturing of digital data, or can be presented based on a request of one or more users. For example, where the devices capturing digital data is owned by or otherwise associated with the instructor observing the scene, the system could present the instructor with commercial offerings based on a type of request made by the instructor. The request type can be related to lesson planning suggestions, in which case the system may provide a commercial offering of a downloadable worksheet, a streamable lecture or a teacher's guide for purchase that is associated with a determination that students in the scene are bored, tired, disinterested, distracted, feeling trapped, or restless.

Healthcare

Another contemplated use of a system of the inventive subject matter is related to the field of healthcare. As patients are not known to be entirely forthcoming when it comes to their health background, a data capturing device can be used in combination with inputs by a physician, nurse or other user to assist a physician in determining a diagnosis, prognosis, prescription or need of a patient.

Where a female patient having severe stomach pain visits a physician with her mother, the physician can input relevant patient information into a computing device based on a series of questions. For example, the physician may input information associated with the following: the mom being present, the female practicing safe sex, the female not having eaten anything out of the ordinary in the last 24 hours, and the female having had the pain for at least 48 hours. A system of the inventive subject matter could be programmed to obtain the information input by the physician, and to also obtain digital data captured by a video/audio recorder during the questioning. The system can use both the information provided by the physician and the digital data to determine sentiment characteristics associated with at least one of the patient and the physician. Some of all of the sentiment characteristics can then be used to determine sentiment states of nervousness, fearful, dishonesty, and distraction associated with the patient based on the digital data, and the set of sentiment states can be mapped to, for example, a commercial offering of a take-home pregnancy test, an appointment for an ultrasound or prenatal vitamins.

Gaming

Yet another contemplated use of a system of the inventive subject matter is related to the field of game play. A webcam communicatively coupled to a computing device can be configured to capture data representing one or more players of a game operated by computer circuitry and incorporating artificial intelligence technologies or character development options. The captured data can be used to infer sentiments of a player in real-time or near real-time, and to generate intelligent behaviors based at least in part on the player sentiments, or to impact the characters or storyline of the game being presented to the player. For example, an inspirational storyline could be presented to a player when a state of sadness, depression or defeat is inferred, causing the player to become happy or encouraged. Then, upon inferring a state of happiness or encouragement, a devastating plot twist could be presented to the player.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as", etc.) provided with respect to certain embodiments herein is intended merely to better illuminate the invention and does not pose a limitation on the scope of the invention otherwise claimed. No language in the specification should be construed as indicating any non-claimed element essential to the practice of the invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

What is claimed is:

1. A system to facilitate a transaction comprising:
    a digital sensor configured to capture a digital representation of a scene;
    one or more memories storing a plurality of sentiment characteristics, a plurality of sentiment states, and a plurality of commercial offerings, wherein each sentiment state of the plurality of sentiment states is associated with a set of sentiment characteristics; and
    a processor communicatively coupled with the one or more memories and the digital sensor and programmed to:
        obtain, via the digital sensor, digital data representative of the scene, including at least some data that is derived by executing an object recognition algorithm;
        using the digital data representative of the scene, associate sets of scene data with sentiment characteristics;
        using the associated sentiment characteristics, determine a first sentiment state of the plurality of sentiment states that is associated with the digital data;
        determine a transaction that is associated with the first sentiment state from the plurality of commercial offerings based at least in part on a fitness measure that is calculated as a distance or as a count of a number of criteria that correspond to the first sentiment state; and
        facilitate the transaction with a provider.

2. The system of claim 1, wherein the digital data comprises the digital representation of the scene.

3. The system of claim 1, wherein the digital data comprises scene data derived from the digital representation of the scene.

4. The system of claim 1, wherein the digital representation comprises an image.

5. The system of claim 1, wherein the digital representation comprises a sound.

6. The system of claim 1, wherein the plurality of sentiment states includes at least one of an emotional, a cognitive and a body-awareness state.

7. The system of claim 1, wherein the processor is programmed to provide a service distal to a person.

8. The system of claim 1, wherein the processor is further programmed to determine a second sentiment state of the plurality of sentiment states that is associated with the digital data, and wherein the first commercial offering is associated with the first and second sentiment states.

9. The system of claim 7, further comprising a communications subsystem that provides a link to the person to facilitate the transaction.

10. The system of claim 1, further comprising a communications subsystem that provides a link to a vendor to facilitate the transaction.

11. The system of claim 1, further comprising a communications subsystem that further facilitates the transaction by initiating or causing the execution of at least one of a sale, purchase, license, and lease.

12. The system of claim 1, wherein the digital representation of the scene includes at least a representation of at least a portion of a face.

13. The system of claim 12, wherein the face comprises a person's face.

14. The system of claim 1, wherein the processor is further programmed to receive the digital data from a device that is not carried by a person.

15. The system of claim 1, wherein a sentiment state is a valid match to sentiment characteristics even where each of the characteristics associated with the state is not present.

16. The system of claim 1, wherein a sentiment characteristic is a valid match to scene data even where one or more of the items associated with the characteristic is not present.

17. The system of claim 1, wherein the subject matter of the transaction comprises a physical product.

18. The system of claim 1, wherein the subject matter of the transaction comprises a service.

19. The system of claim 1, wherein the subject matter of the transaction comprises digital content.

20. The system of claim 1, wherein the subject matter of the transaction comprises a discount on video games, massage services, or boxing equipment.

21. The system of claim 1, wherein the transaction is a digital transaction including any of a sale, a purchase, an exchange, a preview, a download, a streaming, an order, a payment, a hold, a license, or a lease.

22. The system of claim 1, wherein the transaction is an education transaction including any of a streamable lecture, a teacher's guide, lesson planning suggestions, or downloadable worksheets.

23. The system of claim 1, wherein the transaction is a healthcare transaction addressing prenatal care, including any of a take home pregnancy test, an appointment for ultrasound, or a prescription for prenatal vitamins.

24. The system of claim 1, wherein the transaction is a gaming transaction, including, in a game, altering game characters or storylines based on inferred sentiments of a player.

25. A method to facilitate a transaction comprising:
capturing, by a digital sensor, a digital representation of a scene;
storing, in one or more memories, a plurality of sentiment characteristics, a plurality of sentiment states, and a plurality of commercial offerings, wherein each sentiment state of the plurality of sentiment states is associated with a set of sentiment characteristics;
obtaining, via the digital sensor, digital data representative of the scene, including at least some data that is derived by executing an object recognition algorithm;
using the digital data representative of the scene, associating sets of scene data with sentiment characteristics;
using the associated sentiment characteristics, determining a first sentiment state of the plurality of sentiment states that is associated with the digital data;
determining a transaction that is associated with the first sentiment state from the plurality of commercial offerings, based at least in part on a fitness measure that is calculated as a distance or as a count of a number of criteria that correspond to the first sentiment state; and
facilitating the transaction with a provider.

26. A non-transitory computer readable medium, storing instructions that, when executed, perform a method comprising:
capturing, by a digital sensor, a digital representation of a scene;
storing, in one or more memories, a plurality of sentiment characteristics, a plurality of sentiment states, and a plurality of commercial offerings, wherein each sentiment state of the plurality of sentiment states is associated with a set of sentiment characteristics;
obtaining, via the digital sensor, digital data representative of the scene, including at least some data that is derived by executing an object recognition algorithm;
using the digital data representative of the scene, associating sets of scene data with sentiment characteristics;
using the associated sentiment characteristics, determining a first sentiment state of the plurality of sentiment states that is associated with the digital data;
determining a transaction that is associated with the first sentiment state from the plurality of commercial offerings, based at least in part on a fitness measure that is calculated as a distance or as a count of a number of criteria that correspond to the first sentiment state; and
facilitating the transaction with a provider.

* * * * *